United States Patent [19]

Glasson et al.

[11] 3,892,414

[45] July 1, 1975

[54] GOLF BALL DIRECTION INDICATOR

[76] Inventors: William J. Glasson, 355 S. Granados Ave., Solana Beach; Robert L. Janssen, 900 S. Six Ave., Hacienda Heights, both of Calif. 92075

[22] Filed: Mar. 20, 1974

[21] Appl. No.: 453,012

[52] U.S. Cl.................... 273/185 R; 273/181 H
[51] Int. Cl.............................................. A63b 69/36
[58] Field of Search .......... 273/176, 181, 184, 185, 273/186

[56] References Cited
UNITED STATES PATENTS

| | | | |
|---|---|---|---|
| 3,020,049 | 2/1962 | McNeill | 273/186 R A |
| 3,759,528 | 9/1973 | Christophers | 273/185 R |
| 3,778,064 | 12/1973 | Nutter | 273/181 H X |
| 3,784,207 | 1/1974 | Gentiluomo | 273/181 H X |
| 3,814,438 | 6/1974 | Baron | 273/185 R |

*Primary Examiner*—George J. Marlo

[57] ABSTRACT

A golf ball direction indicator in which a photosensitive element is placed in front of a golf ball mounted on a tee on a pad with three other photosensitive elements disposed in front of the first photosensitive element which the ball would pass over if it were going straight, to the right, or to the left, respectively. The first photosensitive element starts a timer which is stopped by the ball passing over any one of the three directional photosensitive elements. Each of the three directional photosensitive elements forms an input to a logic network which turns on an appropriate indicator light, and locks out the other two, depending upon which element the ball passed over first, i.e., center, right or left. If the timing mechanism indicates a speed under a predetermined level which would indicate that the ball did not pass over any of the direction photosensitive elements, the timer inhibits the lighting circuits of all three direction lights to obviate the possibility of a false reading which could be caused by the club head passing in proximity with one or more of the front three photosensitive elements.

5 Claims, 2 Drawing Figures

3,892,414

GOLF BALL DIRECTION INDICATOR

BRIEF DESCRIPTION OF THE INVENTION

The present invention relates to a golf ball direction indicator and more particularly to a golfball direction indicator which indicates general trajectory azimuth.

According to the invention, a golf ball direction indicator is provided for indicating the general direction of a golf ball in which four photosensitive elements which can be photo transistor light cells, for example, are placed on a pad in front of a golf ball to be driven. The first element is utilized for starting a speed count and is placed directly in front of the golf ball with the other three disposed for indicating general direction of the driven ball, i.e., center, right or left. When the golf ball is driven over the timing photoelectric element, and passes over one of the direction photoelectric elements, the timing element starts a clock and any one of the three direction elements stops a clock which indicates the speed of the ball. The three direction elements pass through logic circuitry which result in a direction light being energized corresponding to which direction photoelectric element the ball first passed over. Lock-out circuitry locks out the other two direction lights. If the ball does not pass over any one of the three direction lights, the ball speed timer will indicate a low speed due to the golf club passing over one of the three direction lights. At below a predetermined speed a disabling signal is coupled from the ball speed timer to the ball direction indicator logic circuitry, disabling all three channels to obviate the possibility of a false reading which could be caused by the club head passing in proximity with one or more of the photosensitive elements.

An object of the present invention is the provision of an improved golf ball direction indicator.

Another object of the invention is the provision of a golf ball direction indicator and ball speed timing combination.

A further object of the invention is the provision of a golf ball direction indicator which is inexpensive to manufacture and extremely simple in installation.

Other objects and many of the attendant advantages of the present invention will be readily appreciated as the same becomes better understood by reference to the following detailed description when considered in connection with the accompanying drawing in which like reference numerals designate like parts throughout the figures thereof and wherein:

FIG. 1 is a schematic representation of the physical layout of the preferred embodiment of the present invention; and FIG. 2 is an electrical schematic diagram of the embodiment of FIG. 1.

DETAILED DESCRIPTION OF THE DRAWING

Figure 1:
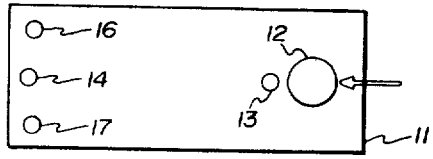

Referring to FIG. 1, a pad is schematically shown at 11 with a tee mounted golf ball 12 and a photoelectric cell 13 disposed in the immediate vicinity thereof. Photoelectric cells 14, 16 and 17 are disposed in a row ahead of photoelectric cell 13 and ball 12.

Figure 2:
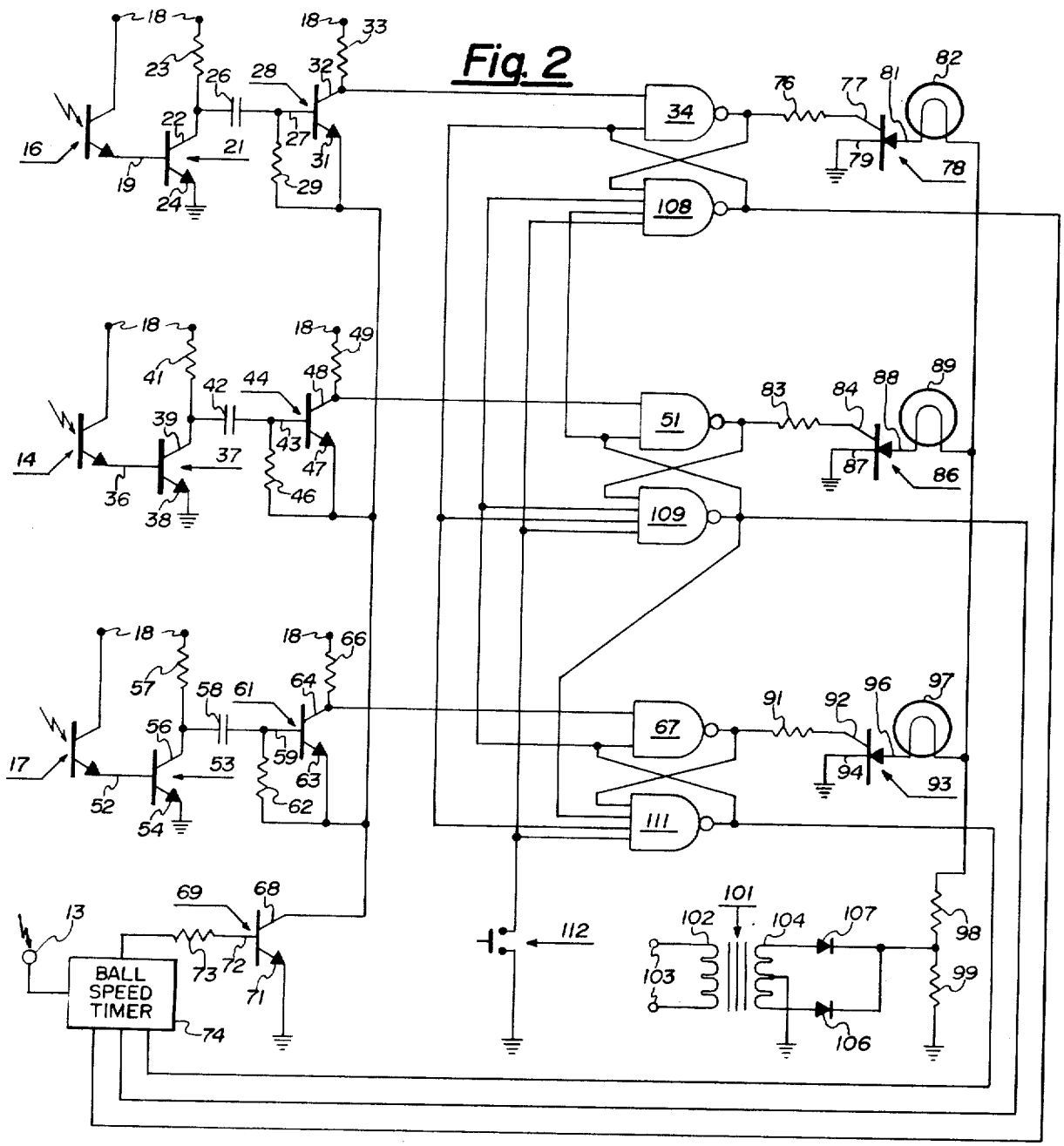

Referring to FIG. 2, photoelectric cell 16 is connected at one end to positive power supply terminal 18 and at another end to base 19 of transistor 21. Collector 22 of transistor 21 is coupled through resistor 23 to positive terminal 18. Emitter 24 of transistor 21 is grounded. Collector 22 is also coupled through capacitor 26 to base 27 of transistor 28. Base 27 is also connected through resistor 29 to emitter 31 of transistor 28. Collector 32 of transistor 28 is connected through resistance 33 to positive terminal 18 and to one input of NAND gate 34. Photosensitive element 14 is connected on one side to positive terminal 18 and on another side to base 36 of transistor 37. Emitter 38 is connected to ground. Collector 39 of transistor 37 is coupled through resistor 41 to positive terminal 18 and through capacitor 42 to base 43 of transistor 44. Base 43 is also connected through resistance 46 to emitter 47. Collector 48 of transistor 44 is connected through resistance 49 to positive terminal 18 and to one input of NAND gate 51.

Photosensitive element 17 is connected to one side of positive terminal 18 and on another side to face 52 of transistor 53. Emitter 54 of transistor 53 is connected to ground. Collector 56 is connected through resistance 57 to positive terminal 18 and through capacitor 58 to base 59 of transistor 61. Base 59 of transistor 61 is also connected through resistor 62 to emitter 63. Collector 64 is connected through resistance 66 to positive terminal 18 and to one input of NAND gate 67. Emitters 31, 47 and 63 of transistors 28, 44 and 61, respectively, are all connected together and to collector 68 of transistor 69. Emitter 71 of transistor 69 is connected to ground and base 72 of transistor 69 is connected through resistor 73 to an output of ball speed timer 74.

An output of NAND gate 34 is connected through resistor 76 to control element 77 of SCR 78. Emitter 79 of SCR 78 is grounded and anode 81 of SCR 78 is coupled to one side of indicator light 82. An output of NAND gate 51 is coupled through resistance 83 to control element 84 of SCR 86. Cathode 87 of SCR 86 is grounded and anode 88 of SCR 86 is connected to one end of indicator light 89. The output of NAND gate 67 is coupled through resistance 91 to control element 92 of SCR 93. Cathode 94 of SCR 93 is grounded and anode 96 of SCR 93 is connected to one side of indicator light 97. The other sides of indicator lights 82, 89 and 97 are connected together and through resistances 98 and 99 in series to ground. Power transformer 101 has a primary winding 102 coupled to input terminals 103. Center tap secondary winding 104 has a center tap grounded and is coupled through rectifiers 106 and 107 to the junction of resistances 98 and 99.

The output of NAND gate 34 is also connected to a first input of NAND gate 108. The output of NAND gate 108 is connected to an input of ball speed timer 74 and to a second input of NAND gates 34 and to a third input of NAND gates 109 and 111. The output of NAND gate 109 is connected to another input of ball speed timer 74 and to a second input of NAND gate 51 and NAND gate 111 and a third input of NAND gate 108. The output of NAND gate 111 is coupled to another input of ball speed timer 74 and to a second input of NAND gate 67 and NAND gate 109 and NAND gate 108. A fourth input of NAND gates 108, 109 and 111 are coupled through pushbutton switch 112 to ground.

OPERATION

Referring back to FIG. 1, it can be seen that if a ball to be driven on a practice driving range, for example, is placed at 12 and photosensitive elements 14, 16 and 17 are disposed as shown, when the ball is driven in the direction of the arrow it will pass over photosensitive element 13 and should pass over one of the other three photosensitive elements 14, 16 and 17, depending on how straight the ball is driven. In this illustration, the ideal direction for ball 12 will be over photosensitive element 14 which will give a central direction indication by lighting lamp 89 (FIG. 2). If the ball passes over elements 16 or 17, direction lamps 82 or 97, respectively, will be energized, indicating the general direction of the driven ball. At the same time as the ball passes over photosensitive element 13, a ball speed timer is started which is shown at 74 in FIG. 2. This can be a simple clocked device which will keep running until stopped. A control circuitry is provided as will be seen with reference to FIG. 2, which stops the count when the ball passes over one or more of the direction elements 14, 16 and 17, yielding both direction and ball speed.

Referring to FIG. 2, the operation of the control circuitry will be described. Quiescently, transistors 21, 37 and 53 are conducting and transistors 28, 44 and 61 are cut off at zero bias. This means that the inputs to NAND gates 34, 51 and 67 are high and their respective outputs are low. Hence, SCRS 78, 86 and 93 will cut off and lamps 82, 89 and 97 are not energized. Since the outputs of NAND gates 34, 51 and 67 are coupled to an input of NAND gates 108, 109, 111, respectively, the outputs of NAND gates 108, 109 and 111 are quiescently in a high state.

Assuming the golf ball 12 is driven and has passed over element 13, the ball speed timer 74 will begin a speed count. If the ball passes over central element 14, a signal will be present at base 36 of transistor 37. This will decrease the current flow through transistor 37, resulting in a positive voltage being applied through capacitor 42 to base 43 of transistor 44. Transistor 44 will conduct, dropping the voltage at collector 48, presenting a low signal to the first input of NAND gate 51. When this happens, a high signal appears at its output which is passed through resistor 83 to the control element 84 of SCR 86. At this time, current will flow through SCR 86 and indicator light 89, indicating a central direction of drive. At this time, the high signal at the output of gate 51, which is coupled to the input of gate 109, converts the input of gate 109 to a low point which stops ball speed timer 74. This output also is fed to an input of gates 108, 111, converting their outputs to a low condition, which in turn locks out gates 34 and 67, i.e., should a signal appear from photosensitive elements 16 or 17 the gates 34 or 67, this signal will be instantaneously passed through their respective lighting circuits, but the signals applied from the outputs of gates 108 and 111 will revert gates 34 and 67 to their quiescent state immediately while the low at the output of gate 109 will hold the output of gate 51 at a high condition, locking lamp 89 in an energized condition. The other two channels, i.e., from photosensitive elements 16 and 17, operate in an identical fashion which results in only one lamp being energized for any given drive. After the ball has been driven and the indication has been noted, switch 112 is depressed, grounding inputs to NAND gates 111, 109 and 108, which reset the entire system.

If for any reason the ball does not go over one of the three direction cells 14, 16 or 17, the golf club will eventually pass over one or more of the cells which would result in an extremely slow ball speed being indicated by ball speed timer 74. Should this happen, ball speed timer is set to yield an output if the speed indication is under 65 miles per hour (approximately), which would cut off transistor 69 and hence transistors 28, 44 and 61, resulting in no direction lamps being lit.

A power transformer 101 is coupled to an AC power source at terminals 103. The output at secondary winding 104 is a typical full wave rectifier which is unfiltered. Bleeder resistor 99 brings the pulsating DC completely to substantially zero on each half cycle, resulting in the energizing voltage being applied to the anodes 81, 88 and 96 of SCR 78, 86 and 93, respectively, coming to zero, one hundred twenty times per second in the case of a sixty-cycle line power. This insures that the current through any of the SCRS will extinguish one hundred twenty times per second to restore control to their respective control elements.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:

1. A golf ball direction indicator comprising:
   a plurality of photosensitive elements spatially disposed in proximity with a golf tee;
   a direction indicator lamp corresponding to each of said photosensitive elements;
   a plurality of switching means, said plurality of switching means coupled between each of said photosensitive elements and said indicator lamps and operable for energizing the associated indicator lamp when a golf ball passes over one of said plurality of photosensitive elements indicating a general direction of trajectory of a golf ball; and
   said switching means includes lock-out means innerconnected for locking out any remaining indicator lamps when one has been energized.

2. The golf ball direction indicator of claim 1 wherein:
   said plurality of photosensitive elements are linearally disposed defining a line at right angles to the desired golf ball trajectory.

3. The golf ball direction indicator of claim 1 and further including:
   lock out means coupled to the switching means associated with each indicating lamp and operable for disabling all of said indicating lamps if a driven golf ball does not pass over any of said plurality of photosensitive elements.

4. The golf ball direction indicator of claim 3 wherein said lock out means includes:
   a ball speed timer;
   a time starting photosensitive element disposed between said plurality of photosensitive elements and a golf ball to be driven, said timer photosensitive element coupled to said ball speed timing means for commencing a speed timing count;
   said plurality of switching means coupled to said ball speed timer and operable for stopping a timing count when a ball passes over any one of said plurality of photosensitive elements; and
   said ball speed timing means having an output coupled to said plurality of switching means and operable for disabling all of said indicating lamps should a ball speed be under a predetermined level.

5. The golf ball direction indicator of claim 1 and further including:
 a ball speed timer;
 a time starting photosensitive element disposed between said plurality of photosensitive elements and a golf ball to be driven, said timer photosensitive element coupled to said ball speed timing means for commencing a speed timing count; and
 said plurality of switching means coupled to said ball speed timer and operable for stopping a timing count when a ball passes over any one of said plurality of photosensitive elements.

* * * * *